July 2, 1940.　　　L. F. BORCHARDT　　　2,206,344
ELECTRIC LIGHT SOURCE FOR EXAMINATIONS OF TRANSPARENT MEDIA
Filed Oct. 31, 1938　　　2 Sheets-Sheet 2
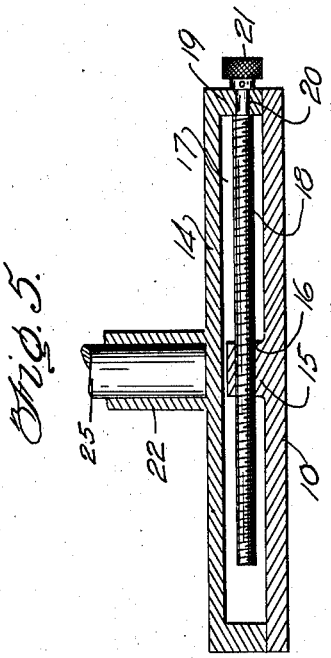
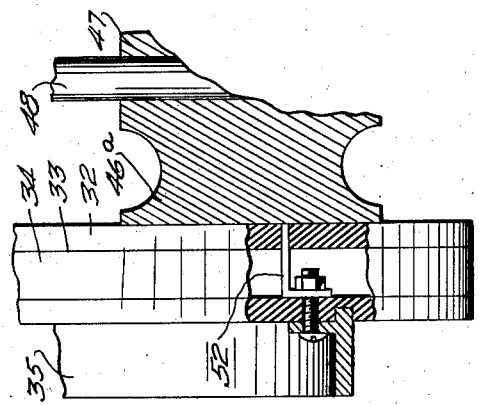
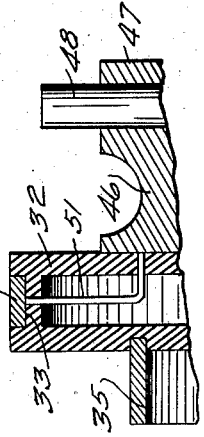
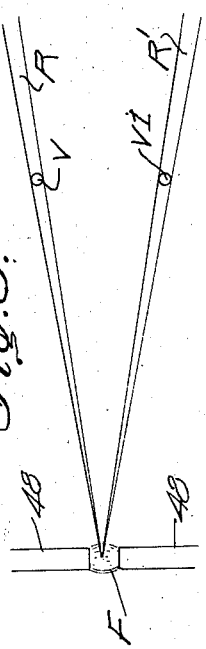
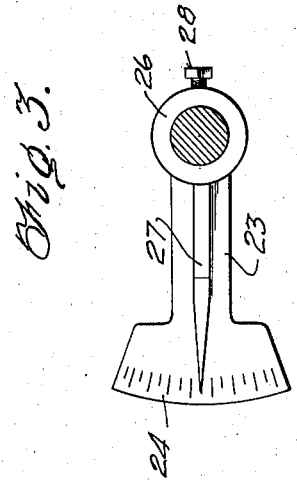
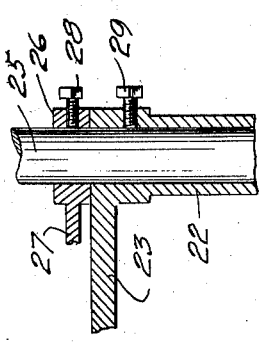
Inventor
LESTER F. BORCHARDT,
By Robert E. Sadtler
Attorney Patented July 2, 1940

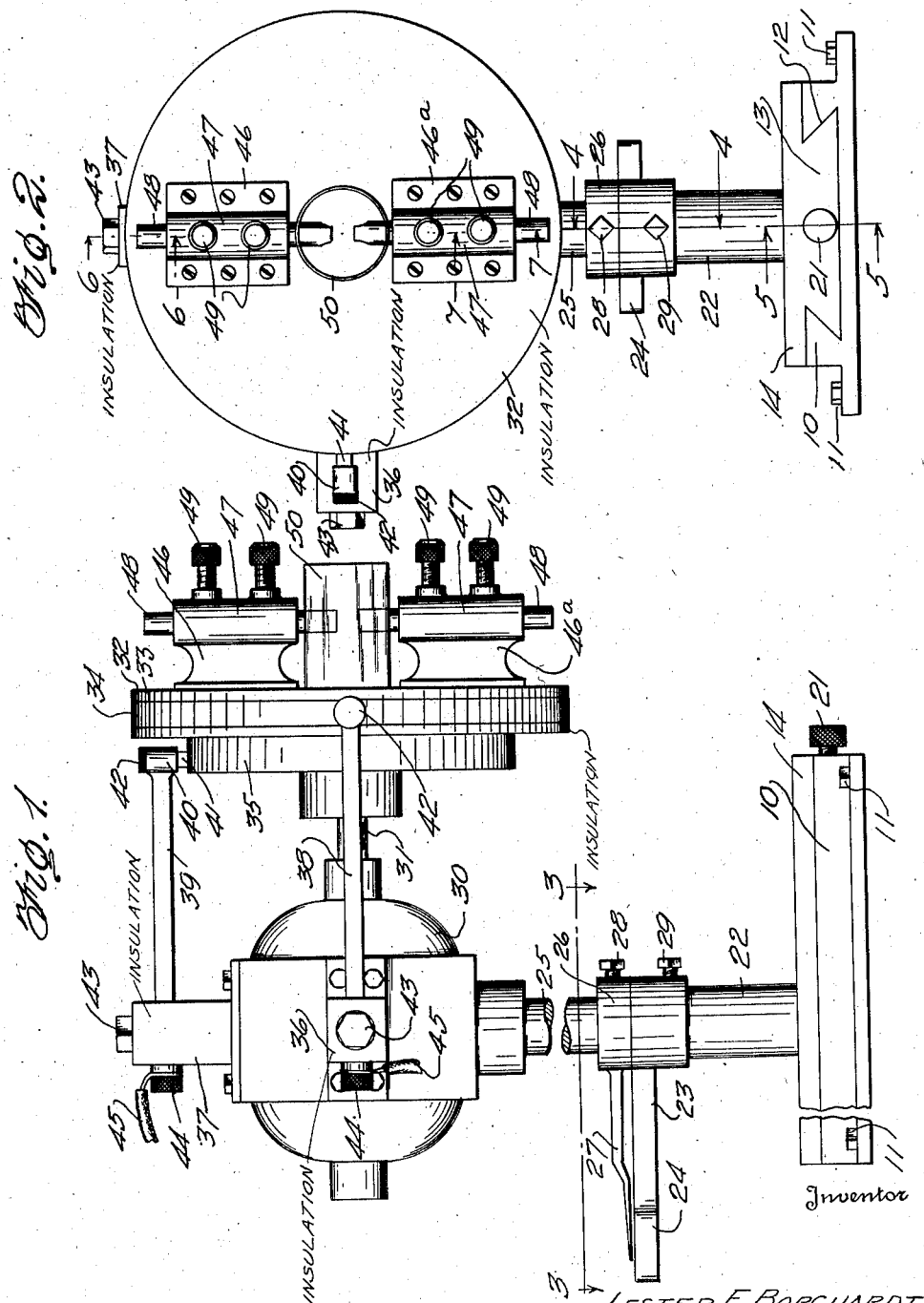

2,206,344

UNITED STATES PATENT OFFICE 2,206,344

ELECTRIC LIGHT SOURCE FOR EXAMINATIONS OF TRANSPARENT MEDIA

Lester F. Borchardt, Minneapolis, Minn., assignor to General Mills, Inc., a corporation of Delaware Application October 31, 1938, Serial No. 238,118

6 Claims. (Cl. 176—41)

In investigations involving identification, structure and sometimes quantity of various materials by means of light passing therethrough, a device known as the sector photometer is frequently used. Briefly the sector photometer serves the function of measuring the ratio between the amount of light which passes the unknown solution under investigation and that which passes a standard solution or, more frequently, the solvent in which the materials under investigation are placed. In operation, two beams of light are taken from a convenient or suitable light source, one beam passing through the solution under investigation and the other passing through the solvent. In order to carry out the investigation properly, it is essential that both of these beams have equal average intensity of illumination.

It has been the problem since the invention of the sector photometer to find a light source which would fulfill the condition of equally illuminating the two beams.

Perhaps the most common source of light used with the spectrograph itself is the arc, such as the carbon arc, copper arc, etc. Since the electrodes used in the arc burn away relatively fast, they are totally unsuited for use with the sector photometer since frequent difficult adjustments would be necessary.

A light source sometimes used with the sector photometer is of the discharge tube type such as the hydrogen arc, but the equipment required for such a source is expensive and unless one uses a direct current, a condition which to obtain sufficient intensity is difficult to fulfill, one is seriously troubled with the stroboscopic effect due to the alternating current voltage applied across the electrodes of the arc. It is frequently necessary to use a rocking mirror with such discharge tubes since the intensity of the light varies from the center of the discharge to the outside. The rocking mirror integrates the light so that an average value is obtained. This rocking device is clumsy, difficult to mount and quite expensive.

The light source most frequently used with the sector photometer is known as the high frequency spark. In this type of light source, the air between two electrodes is broken down due to ionization by the high voltage impressed between the electrodes and current is thereby enabled to pass across the gap producing a spark. Due to the heating of the electrodes, some of the material is vaporized and radiations characteristic of this material are emitted. The electrodes wear away slowly and hence it would seem that such a source would be an ideal one. However, an investigation shows that the distribution of light between the electrodes is anything but uniform. If there were an inequality in light intensity along only one axis of the luminous field, the inequality might be overcome by exposing with the electrodes in one position for a given time and then exposing for an equal time with the electrodes rotated (in a plane perpendicular to the optical axis) 180° from the first position. Usually the entire region between the electrodes emits light of varying intensity. To make corrections by the method indicated above would require many positions of the electrodes with a corresponding consumption of time.

An object of the present invention is to provide a novel apparatus whereby the luminous field will be of uniform average intensity when used as the light source for a sector photometer.

Another object of the invention is to provide an apparatus of this character and for the purpose set forth wherein the necessary adjustments can be rapidly and effectively made.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of the spark gap apparatus forming this invention.

Figure 2 is a front view thereof.

Figure 3 is a fragmentary section on the line 3—3 of Figure 1.

Figure 4 is a fragmentary section on the line 4—4 of Figure 2.

Figure 5 is a fragmentary section on the line 5—5 of Figure 2.

Figure 6 is a fragmentary section on the line 6—6 of Figure 2, the section showing only a portion of the insulating drum and a portion of an electrode holder with the connection there between.

Figure 7 is a section similar to Figure 6 but taken on the line 7—7 of Figure 2 and being partially in side elevation.

Figure 8 is a schematic view showing the use of the device in photometric work.

In the embodiment of the invention herein disclosed there is provided a base 10 having suitable means, such as indicated by the bolts 11 for holding the base firmly in position. This base has its upper part formed with a dove-tail slot 12 wherein fits a dove-tail rib 13 formed on the under side of a slide 14. The base 10 is provided with an upstanding lug 15 (Fig. 5) having a screw threaded opening 16 therein and the slide 14 has a recess 17 extending longitudinally thereof on its under side so that a screw 18 may pass through a wall 19 formed at one end of the slide 14 and engaged in the threaded opening 16. The screw 18 is reduced as at 20 where it passes through the wall and on the outer end of the screw is fitted a knurled head 21 so that the screw may be rotated without moving longitudinally relative to the slide 14. Thus the slide can be adjusted longitudinally of the base 10. Extending upwardly from the slide 14 is a sleeve 22 which carries an arm 23 projecting radially therefrom at its upper end and this arm terminates in a graduated arc 24. Slidably and rotatably fitted in the sleeve 22 is a standard 25 whereon is mounted a collar 26 from which projects radially a pointer 27. The collar 26 has extending therethrough a set screw 28 by which the collar may be fixed at any desired point in the length of the standard 25. The collar 26 rests on top of the sleeve 22 and by adjusting the collar longitudinally of the standard 25 it is obvious that the standard may be held in the sleeve 22 in any desired position of elevation relative to the sleeve. Also at the upper end of the sleeve 22 is a set screw 29 by means of which the standard 25 may be secured against rotation. Obviously, if the screw 29 is released and the collar is clamped to the standard 25 the pointer 27 will rotate if the standard be rotated.

Fixed on the upper end of the standard is an electric motor 30 the axis of which is at right angles to the standard 25. This motor has a shaft 31 which carries at its end a disk 32 of insulating material having a peripheral groove 33 wherein is seated a slip ring 34 of suitable conductive material. To the rear face of the drum 32 is fixed a slip ring 35 which is concentric with the disk and which is spaced at such distance from the ring 34 as to eliminate any possibility of a spark jumping between the slip rings 34 and 35. Suitably fixed to the motor 30 are insulating posts 36 and 37 and through these posts extended conductor bars 38 and 39 carrying at their outer ends sleeves 40 for holding brushes 41, each sleeve being preferably provided with a screw closure 42 at its outer end. The brush carried by the arm 38 contacts with the slip ring 34 while the brush carried by the arm 39 contacts with the ring 35. Bolts 43 hold the bars 38 and 39 firmly in the posts 36 and 37 and each of the bars is provided with a binding screw 44 by means of which high tension wires 45 are connected to the respective arms 38 and 39. On the forward face of the disk 32 is fixed a pair of electrode holders 46 and 46a having sleeves 47 wherein are slidably mounted aligned electrodes 48 of any preferred metal, high speed tool steel being found well adapted for the purpose. Binding screws 49 serve to hold the electrodes 48 in adjusted positions. Slip rings 34 and 35 are connected to the respective holders 46 by conductors 51 and 52.

In order to eliminate distortion of the spark caused by air currents under high speed rotation a hollow cylinder 50 of mica or other suitable material is carried by the front of the disk and encloses the spark gap between the electrodes 48. By means of this cylinder fan action at the space between such electrodes is substantially eliminated.

In use, the electrodes are so adjusted relative to each other that the center of the luminous field will lie in the axis of rotation of the disk 32. When this is done the electrodes are firmly locked in position by means of the screws 49. By manipulating the knob 21 and adjusting the pointer 27 and sleeve 26, the center of the spark gap is brought to the right height and the axis 10 of rotation is brought to the correct angular adjustment. Furthermore, the screw 21 is used to adjust the distance of the spark gap accurately toward and from the transparent vessels to be observed. Referring now to Figure 8, we may assume that V and VI indicate respectively the standard solution and that under investigation. The spark gap field is indicated at F and the rays utilized from this field are indicated respectively at R and R'. If now the field F has been properly adjusted and the electrodes are rotated about the axis of the field at a high speed the effective illumination emanating along the paths of the rays R and R' will be equal so that an accurate comparison between the standard and test specimens is readily obtained.

There has thus been provided a simple and efficient means for producing two beams of light of equal average intensity.

It is obvious that minor changes may be made in the form and construction of the invention without departing from the material spirit thereof. It is not, therefore, desired to confine the invention to the exact form herein shown and described, but it is desired to include all such as properly come within the scope claimed.

What is claimed is:

1. In a mechanism for producing an electric light source for physical examination of transparent media, supporting means, an electric motor carried by said supporting means and having a shaft, an insulating member fixed on the shaft to rotate therewith, a pair of alined terminal holders carried by said member on opposite sides of the axis of said shaft, a pair of spark gap terminals slidably mounted in said holders, and securing means for fixing said terminals in adjusted positions in said holders.

2. In a mechanism for producing an electric light source for physical examination of transparent media, supporting means, an electric motor carried by said supporting means and having a shaft, an insulating member fixed on the shaft to rotate therewith, a pair of alined terminal holders carried by said member on opposite sides of the axis of said shaft, a pair of spark gap terminals slidably mounted in said holders, securing means for fixing said terminals in adjusted positions in said holders, and a hood enveloping the adjacent ends of said terminals.

3. In a mechanism for producing an electric light source for physical examination of transparent media, supporting means including a pair of telescopic sections forming a standard and means to secure said sections in adjusted telescopic relation, an electric motor carried by said supporting means and having a shaft, an insulating member fixed on the shaft to rotate therewith, a pair of alined terminal holders carried by said member on opposite sides of the axis of said shaft, a pair of spark gap terminals slidably mounted in said holders, and securing means for fixing said terminals in adjusted positions in said holders.

4. In mechanism of the class described, a member rotatable about a longitudinal axis, spark gap terminals carried by the member and spaced substantially equally on the two sides of said axis so as to leave open the space in front of the gap and on the axis of the member, means for rotating the member, and means for passing a succession of electric sparks across the gap whereby light beams produced by a plurality of sparks and viewed at substantially equal angles from the axis and at equal distances from the light source will be of substantially the same average intensity.

5. In mechanism of the class described, a member rotatable about a longitudinal axis, spark gap terminals carried by the member and spaced substantially equally on the two sides of said axis so as to leave open the space in front of the gap and on the axis of the member, means for rotating the member, means for passing a succession of electric sparks across the gap on rotation of the member, and means for axially enclosing the spark gap whereby light beams produced by a plurality of sparks and viewed at substantially equal angles from the axis and at equal distances from the light source will be of substantially the same average intensity.

6. In mechanism of the class described, a member rotatable about a longitudinal axis, spark gap terminals carried by the member and spaced substantially equally on the two sides of said axis so as to leave open the space in front of the gap and on the axis of the member, means for rotating the member, means for passing a succession of electric sparks across the gap on rotation of the member, and a transparent cylindrical sleeve axially enclosing the spark gap whereby light beams produced by a plurality of sparks and viewed at substantially equal angles from the axis and at equal distances from the light source will be of substantially the same average intensity.

LESTER F. BORCHARDT.